M. HEMLEB.
STARTING AND STOPPING MECHANISM FOR POWER DRIVEN MACHINES.
APPLICATION FILED DEC. 2, 1919.
1,409,444. Patented Mar. 14, 1922.
2 SHEETS—SHEET 2.
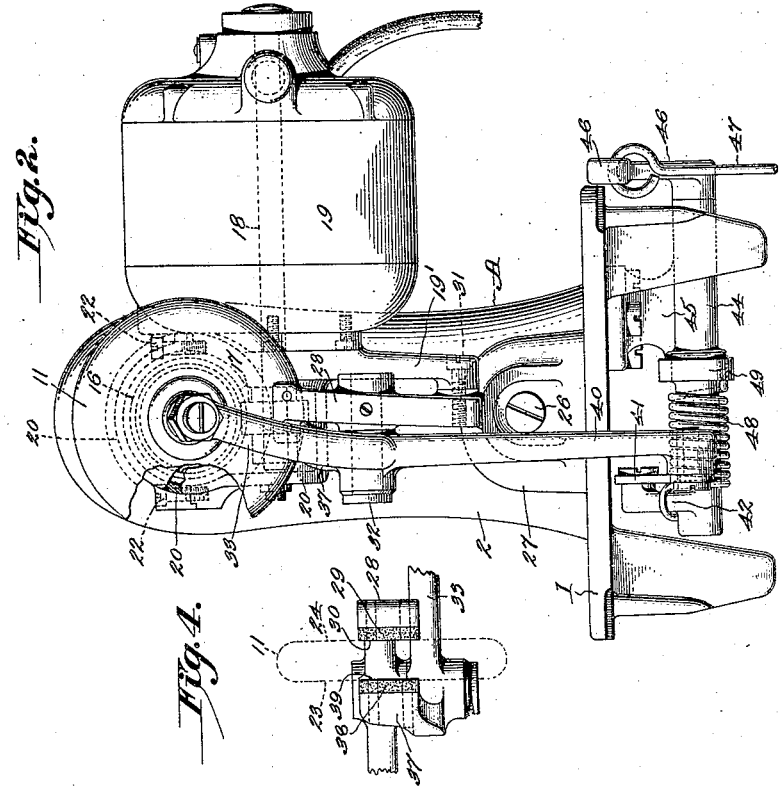
WITNESSES:
INVENTOR
BY
ATTORNEY

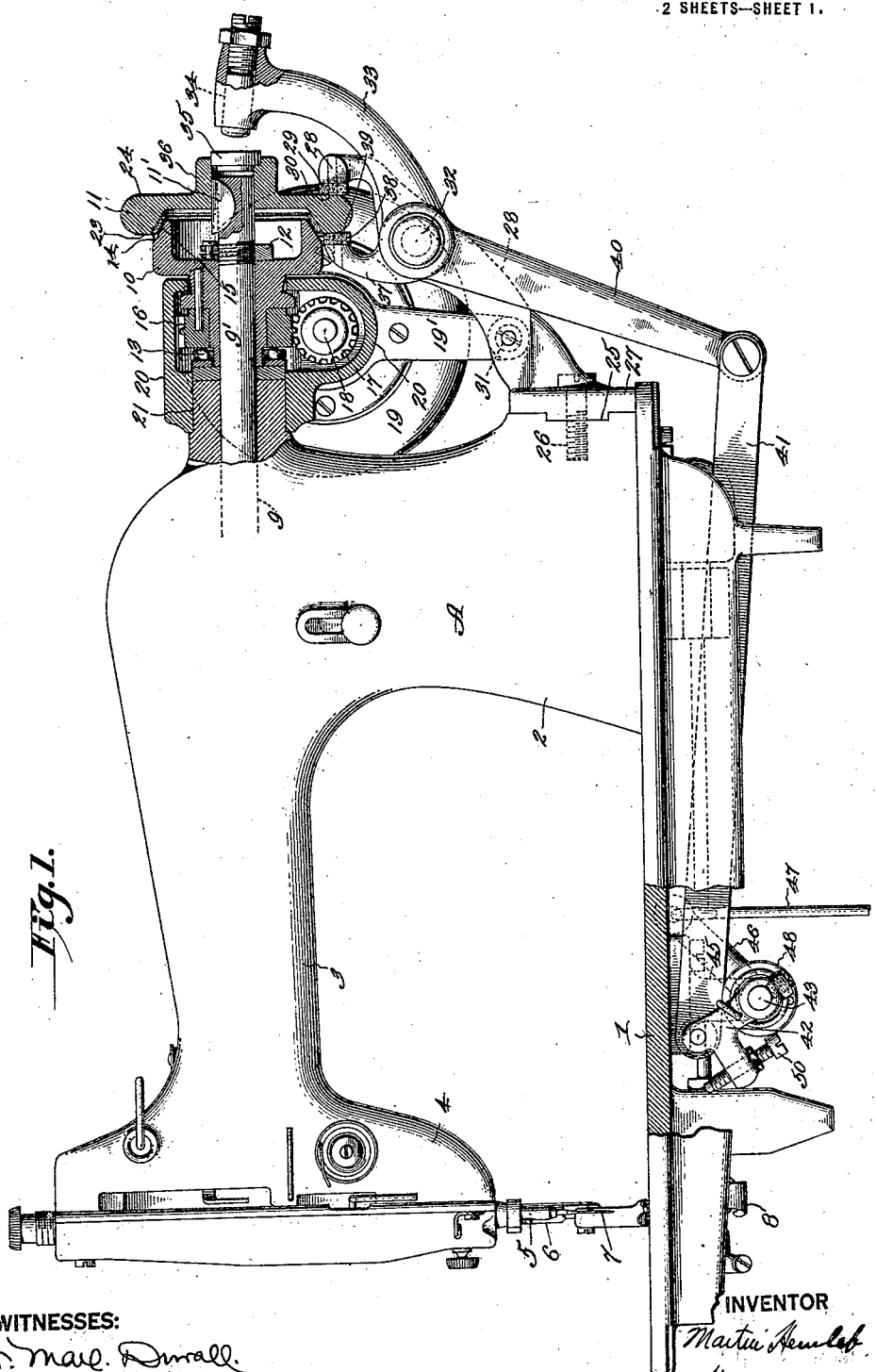

UNITED STATES PATENT OFFICE.

MARTIN HEMLEB, OF ELIZABETH, NEW JERSEY, ASSIGNOR TO THE SINGER MANUFACTURING COMPANY, OF ELIZABETH, NEW JERSEY, A CORPORATION OF NEW JERSEY.

STARTING AND STOPPING MECHANISM FOR POWER-DRIVEN MACHINES.

1,409,444.      Specification of Letters Patent.    Patented Mar. 14, 1922.

Application filed December 2, 1919. Serial No. 341,924.

*To all whom it may concern:*

Be it known that I, MARTIN HEMLEB, a citizen of the United States, residing at Elizabeth, in the county of Union and State of New Jersey, have invented certain new and useful Improvements in Starting and Stopping Mechanisms for Power-Driven Machines, of which the following is a specification, reference being had therein to the accompanying drawings.

This invention relates to starting and stopping or friction clutch and brake devices such as are commonly used for controlling the operation of sewing or other small machines.

With the devices heretofore used, the braking effort has been applied to the driven clutch element solely by means of a movable brake connected to the clutch-controlling lever and it has been found that if sufficient braking effort is applied to the driven clutch element to stop the machine as quickly as is now demanded by users of power-operated machines there is liability of the main-shaft being sprung, to say nothing of the wear and tear on the bearings due to the reactionary pressure of the main-shaft thereagainst.

An object of the present invention is to provide a machine driving device which will permit extremely rapid, positive and negative acceleration of the main-shaft of the machine to be driven without subjecting the main-shaft or its bearings to excessive pressures or thrusts.

A further object of the invention is to provide a machine driving and braking device so contrived as to insure that the driven element is relieved of all drag of the brake when in running position.

A further object of the invention is to provide such a device in the form of an attachment adapted for installation upon any ordinary machine having a main-shaft which projects outwardly beyond the machine frame.

A further object of the invention is to provide a machine driving device of sturdy and extremely simple construction in which the defects of prior similar devices are overcome. Further objects of the invention will appear from the following description and claims.

For the purposes of the present disclosure the invention is embodied in the form of a driving attachment for sewing machines and comprises driving and driven clutch elements carried by the outboard projection of the main-shaft of the machine. One of the characteristic features of the present improvement is the use of a stationary brake element in opposition to a movable brake element, said elements being disposed respectively adjacent the opposite side faces of the driven clutch element or disk. The pressure of the movable brake element is thus exerted in a direction parallel with the main-shaft of the machine. The stationary brake element affords a reactionary pressure equal and opposite to the pressure of the movable brake element, thereby increasing the braking effort of the movable brake element upon the driven disk and eliminating bending strains or end-thrust braking pressures on the main-shaft and its bearings.

Preferably the stationary brake element is in the form of a bracket adapted for attachment to the standard of a sewing machine and affording a fulcrum support for the movable brake element or arm which is preferably rigidly connected to or formed as a part of a manually controlled clutch-lever for pressing the clutch elements into frictional driving relation to one another.

Another feature of the invention resides in the use of a clutch-controlling lever having a plurality of arms one of which shifts the driven clutch element away from the stationary brake element and into engagement with the live clutch element, and another of which shifts the driven clutch element away from the live clutch element and clamps it against the stationary brake. The live clutch element is preferably driven by means of an electric motor to which it is directly connected by means of spiral gears as disclosed in my copending application Serial No. 236,975, filed May 28, 1918; the present construction being an improvement over that disclosed in said application.

In the accompanying drawings, Fig. 1 is a side elevation of a sewing machine embodying the present invention. Fig. 2 is a rear end elevation of the machine. Fig. 3 is a fragmentary bottom plan view. Fig. 4 is a fragmentary top plan view of the stationary and movable brake elements shown in Fig. 1.

The machine A is formed with a frame comprising the bed 1, standard 2 and bracket-arm 3 terminating in the head 4 which supports the needle and presser-bars 5 and 6, respectively, the former carrying the needle 7 which cooperates with a suitable loop-taker 8. The main-shaft 9 of the machine is journaled in the bracket-arm 3 and is operatively connected to the various instrumentalities of the machine in any usual or suitable manner.

The main-shaft 9 includes the outboard projection 9' upon which the driving and driven clutch elements or disks 10 and 11 are mounted. The driving or live clutch element or disk turns freely on the shaft 9, being confined against end play by means of the collar 12 and ball thrust-bearing 13.

The driven clutch disk 11 is splined to the main-shaft 9 so as to rotate with the latter while being free to slide endwise of said shaft toward and away from the live clutch element 10. The spline or key 11' is semi-circular in side elevation and is received within a suitable recess in the shaft 9, as shown in Fig. 1. The clutch elements 10 and 11 are provided with coacting annual friction surfaces 14 and 15, respectively, which are made conical to augment the frictional driving effort of the live clutch element against the driven disk 11.

The live clutch element includes the spiral gear 16 which meshes with the spiral gear 17 on the transverse shaft 18 of the driving motor 19, the frame of which includes or is rigid with the split housing 20 for the gears 16 and 17. As described in my said copending application the split housing 20 is adapted to be clamped upon the rearwardly extending bearing boss 21 of the machine frame by means of screws 22, Fig. 2.

The driven disk 11 is of larger diameter than the driving disk 10 and is formed with the parallel annular side surface portions 23 and 24 the diameter of which is greater than that of the conical surfaces 14 and 15, whereby the driven disk may be acted upon by the braking means to be described, without interference of the braking means with the live clutch element.

Fastened to a seat 25 at the rear of the standard 2 by a screw 26 is the base 27 of an upwardly and outwardly extending bracket 28 the free end of which carries a stationary brake shoe 29 having a braking surface 30 disposed adjacent the face 24 of the driven disk 11 and at substantially right angles to the main-shaft 9. The bracket 28 thus forms a stationary brake which is rigidly mounted on the frame of the machine. An arm 19' rigid with the motor frame and housing 20 is secured at its free end to the bracket 28 by means of a screw 31 thereby assisting in supporting the motor 19.

Fulcrumed to the bracket 28 by means of the pin 32 is a three-armed control lever. One arm 33 of this lever carries an adjustable push-pin 34 made preferably of oil-soaked wood and adapted to bear against the button 35 seated in the end of the hub 36 of the driven disk 11, thereby operating to force said disk away from the stationary braking surface 30 and into driving relation with the live clutch-element 10.

Another arm 37 of the three-armed clutch controlling lever constitutes a movable brake element and is provided with a brake shoe 38 having a braking surface 39, Fig. 4, disposed adjacent the face 23 of the driven disk and in parallelism with the stationary braking surface 30. The arm 37, which is disposed mainly at the side of the disk 11 opposite to that at which the arm 33 is located, operates when the clutch-controlling lever arm 33 is moved away from the driven disk 11 to positively shift said disk away from the live clutch-element 10 and clamp it against the stationary brake 28. The third or operating arm 40 of the three-armed clutch-controlling lever extends downwardly from the fulcrum 32 and may be operated in any suitable manner. In the present instance the arm 40 is connected by a link 41 to the arm 42 fixed to the shaft 43 which is journaled in the sleeve 44 formed as a part of the bracket 45 which is screwed on the under side of the bed 1. Another arm 46 is fixed to the rearward end of the shaft 43 and may be operated by means of a treadle-rod 47. The control of the motor and treadle-rod may, if desired, be effected in the manner disclosed in my said copending application. A coil spring 48, surrounding the sleeve 44 and anchored at its opposite ends to the arm 42 and collar 49 fixed to the sleeve 44, serves to force the movable brake 38 toward the stationary brake 28. The stop-screw 50 limits the upward movement of the arm 33 caused by a pull on the treadle-rod.

While I have described a specific embodiment of the invention it will be obvious to those skilled in the art that the essential features of the invention are susceptible of various other specific embodiments within the scope of the invention as defined in the appended claims.

Having thus set forth the nature of the invention, what I claim herein is—

1. A machine driving device comprising, in combination, a shaft, a live clutch element loose on said shaft, a driven clutch-wheel connected to and slidable axially of said shaft into and out of driving relation with the live clutch element, a movable brake element disposed on the same side of the driven wheel as the live clutch element, a stationary brake element disposed on the opposite side of said driven wheel, and means for shifting the driven clutch-wheel away from the stationary brake element and into engagement with the live clutch element and for operating the movable brake element to shift the driven wheel away from the live clutch element and against the stationary brake element.

2. A machine driving device having, in combination, driving and driven clutch disks, a stationary brake element having its operative surface disposed adjacent one face of the driven clutch-disk, a control lever having clutch and brake arms disposed mainly at opposite sides of the driven disk, the clutch-arm operating to press the driven disk away from the stationary brake and into engagement with the driving clutch-disk, and the brake-arm operating to shift the driven disk away from the driving disk and clamp it against the stationary brake.

3. A machine driving attachment having, in combination, driving and driven disks, a manually controlled lever for establishing and interrupting driving relation between them, a bracket on which said lever is pivoted, said bracket being adapted for attachment to the machine frame and being provided with a stationary braking surface adjacent one side face of the driven disk, and braking means connected to said lever and opposed to said stationary braking surface for clamping the driven disk sidewise against the stationary braking surface.

4. A machine driving device having, in combination, driving and driven disks relatively movable axially to establish and interrupt driving relations between them, a stationary brake rigidly mounted on the frame of the machine and disposed adjacent one side face of the driven disk, a treadle rod, a pivoted three-armed clutch and brake-lever, one of said arms operating to press the driven disk into engagement with the driving disk, another of said arms having a brake surface adjacent the other side face of the driven disk, the third arm of said lever being connected to the treadle-rod.

5. In a machine driving device, the combination with the main-shaft having a free end portion projecting outwardly beyond the frame of the machine, of a live clutch element freely rotatable on the free end of said shaft, a driven clutch disk mounted on and connected to said shaft adjacent the live clutch element and movable axially of said shaft toward and from the live clutch element, a stationary brake having its operative surface disposed adjacent one face of the driven disk, a manually controlled clutch lever having one arm for pressing the driven disk into engagement with the driving clutch element and a brake-arm for moving the driven disk away from said clutch element and into engagement with said stationary brake.

6. A machine driving device having, in combination, driving and driven disks having annular friction driving surfaces, said driven disk being mounted for axial movement toward and away from the driving disk to establish and interrupt driving relations between them and also having annular parallel side-surface portions of greater diameter than said annular friction driving surfaces, a stationary brake adjacent that one of said side surface portions farthest from the driving disk, a control lever for shifting the driven disk toward the driving disk, and a movable brake connected to said control lever and disposed adjacent the other of the annular side surface portions of the driven disk, said movable brake being adapted to shift the driven disk away from the driving disk and clamp the driven disk against the stationary brake.

In testimony whereof, I have signed my name to this specification.

MARTIN HEMLEB.